US005541892A

United States Patent [19]
Kobayashi et al.

[11] Patent Number: 5,541,892
[45] Date of Patent: Jul. 30, 1996

[54] PIEZOELECTRIC SENSOR AND COORDINATE INPUT APPARATUS EMPLOYING THE SAME

[75] Inventors: Katsuyuki Kobayashi, Yokohama; Atsushi Tanaka, Kawasaki; Yuichiro Yoshimura, Kamakura; Ryozo Yanagisawa, Inba-gun; Masaki Tokioka, Fujisawa; Hajime Sato, Yokohama, all of Japan

[73] Assignee: Canon Kabushiki Kaisha, Tokyo, Japan

[21] Appl. No.: 351,230

[22] Filed: Nov. 30, 1994

[30] Foreign Application Priority Data

Dec. 3, 1993 [JP] Japan .................................. 5-303915

[51] Int. Cl.⁶ ............................................................ G01S 3/808
[52] U.S. Cl. ....................................... 367/127; 367/907
[58] Field of Search .................................. 367/907, 140, 367/127; 178/18, 19; 345/177

[56] References Cited

U.S. PATENT DOCUMENTS

| | | | |
|---|---|---|---|
| 4,886,943 | 12/1989 | Suzuki et al. ............................ | 178/18 |
| 4,887,245 | 12/1989 | Mori et al. ............................... | 367/129 |
| 4,897,510 | 1/1990 | Tanaka et al. ............................ | 178/18 |
| 4,910,363 | 3/1990 | Kobayashi et al. ...................... | 178/18 |
| 4,931,965 | 6/1990 | Kaneko et al. .......................... | 364/560 |
| 4,980,518 | 12/1990 | Kobayashi et al. ...................... | 178/18 |
| 5,017,913 | 5/1991 | Kaneko et al. .......................... | 345/177 |
| 5,070,325 | 12/1991 | Tanaka et al. ........................... | 345/179 |
| 5,097,102 | 3/1992 | Yoshimura et al. ..................... | 178/18 |
| 5,142,106 | 8/1992 | Yoshimura et al. ..................... | 178/18 |
| 5,239,138 | 8/1993 | Kobayashi et al. ...................... | 178/18 |

FOREIGN PATENT DOCUMENTS 0169538  1/1986  European Pat. Off. .
54-141681 11/1979  Japan .

*Primary Examiner*—Daniel T. Pihulic
*Attorney, Agent, or Firm*—Fitzpatrick, Cella, Harper & Scinto

[57] ABSTRACT

A piezoelectric sensor for detecting elastic plate vibrations in an object such as the transmission plate in a coordinate input apparatus is prismatic in shape and is fixed to the surface of the object. The prismatic sensor is arranged so that it is parallel to the direction of propagation of the vibrations and has an electrode surface perpendicular to the surface of the object. The arrangement of the prismatic sensor permits the thickness of the object in which the plate vibrations propagate to be substantially reduced and reduces the manufacturing cost of coordinate input apparatus using the prismatic sensor.

7 Claims, 12 Drawing Sheets

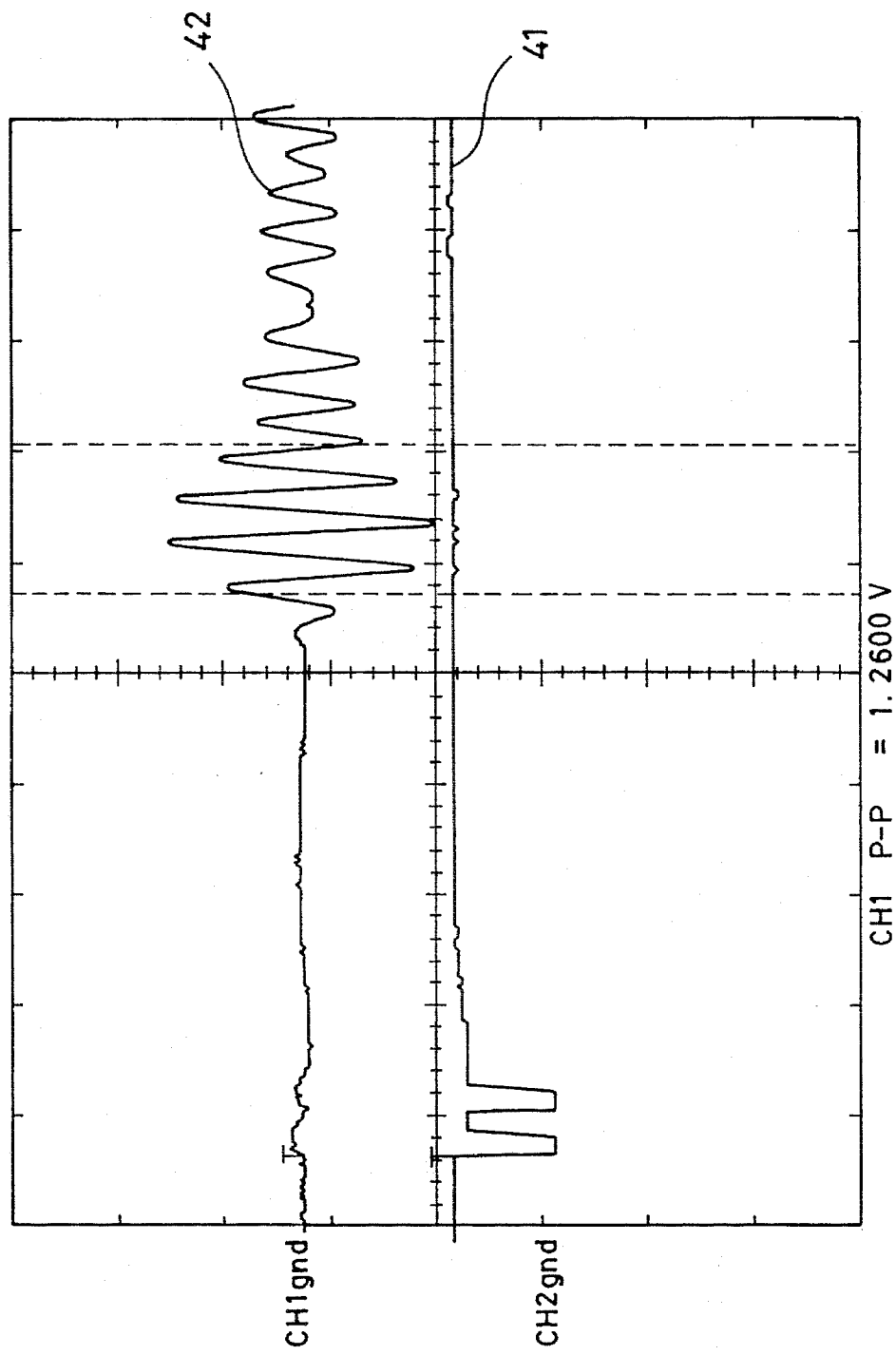

PIEZOELECTRIC SENSOR AND COORDINATE INPUT APPARATUS EMPLOYING THE SAME

BACKGROUND OF THE INVENTION

1. Field of the Invention

The present invention relates to a piezoelectric sensor for detecting a sound wave (vibrations) which propagates in an object to be measured, and a coordinate input apparatus employing such a piezoelectric sensor.

2. Description of the Related Art

Coordinate input apparatuses are known, which are designed to detect sound waves (vibrations) which propagate in all directions from a position on a measuring plate at which a user brings a pen having a vibration element into contact with a measuring plate and to determine a contact position of the pen by detecting a transmission delay time of the propagation.

Such a coordinate input apparatus generally employs, as the vibration detection means for detecting vibrations, a piezoelectric ceramic, such as lead titanate zirconate (hereinafter referred to as PZT). The detecting element has a shape and a vibration mode which assure effective detection of a sound wave having a predetermined frequency and propagating in an object to be measured. In an actual element, the shape thereof is determined such that the mechanical resonance of the sensor coincides with the frequency of the sound wave to be detected, and the mode of the vibrations to be detected and so on are taken into consideration to determine the sensitivity of the element and the method of setting the element. In other words, the shape and so on of the vibration sensor are determined by the vibration mode or the frequency of the sound wave which propagates in the object to be measured.

Conventional piezoelectric elements will be described in more in detail below.

Vibrations of piezoelectric ceramics are classified into transverse effect vibrations in which the direction of an electric field (polarization) is perpendicular to the direction of deformation and longitudinal effect vibrations in which the direction of an electric field (polarization) is parallel to the direction of deformation. FIGS. 8(a) and 8(b) show vibration sensors which utilize transverse effect vibrations, and FIGS. 8(c) and 8(d) show vibration sensors which utilize longitudinal vibrations.

More specifically, the vibration sensor shown in FIG. 8(a) is called a radial vibrator which deforms in a radial direction. In this vibrator, a diameter d of the disk must be sufficiently large relative to a thickness t thereof. The vibration sensor shown in FIG. 8(b) produces vibrations of the bar and deforms in the directions of a length l. In this vibrator, the length l must be sufficiently large relative to a thickness t and a width w to assure free expansion and contraction of the bar in the direction of the length l. In both cases shown in FIGS. 8(a) and 8(b), desirable values for l and d are at least ten times the thickness t.

The vibrator shown in FIG. 8(c) produces longitudinal vibrations of the bar and deforms in the direction of a length l. In this vibrator, although the length l must be sufficiently large relative to a width w to assure free expansion and contraction, a length l which is three to four times that of the width w is used in an actual vibrator because of the floating capacity or the like. The vibration sensor shown in FIG. 8(d) produces vibrations in the direction of a thickness thereof and deforms in the direction of a thickness t (the direction of polarization). In this case, the area of the vibrator must be sufficiently large compared to the thickness t.

As is clear from the foregoing description, the piezoelectric elements capable of detecting vibrations effectively have restrictions of their shape. This will be described in more detail with reference to FIG. 8(a). The element's resonance frequency associated with the piezoelectric transverse effect is determined by the radial length d of the element while the element's resonance frequency associated with the piezoelectric longitudinal effect is determined by the thickness t of the element. Therefore, if the resonance frequencies of both effects are close to each other, the vibration amplitude of the element is small due to vibration mode coupling, making it impossible to obtain a sufficient electric output. That is, as the radial length d and the thickness t become close to each other, the electric output signal level is reduced, and the function of the element deteriorates. The ratio of the radial length d to the thickness t must therefore be sufficiently large.

Various types of coordinate input apparatus utilizing the piezoelectric elements manufactured under the above-described restrictions have been proposed. Examples of such coordinate input apparatus include the one which employs a radial vibrator and the one which employs a columnar longitudinal vibrator.

Further, it is known that how a piezoelectric element is mounted on the vibration transmitting plate serving as an input surface affects the level of the detected signal. In an actual apparatus, the signal level when the piezoelectric element is set on the front surface of the vibration transmitting plate differs from the signal level when the piezoelectric element is set on the side surface of the vibration transmitting plate.

However, the conventional coordinate input apparatus has the following disadvantages.

When vibrations are detected using the above-described types of piezoelectric elements, direct electrical connection to the element cannot be obtained because the electrode surface of the element is adhered to the object to be measured.

Accordingly, it has been proposed to partially provide one of the electrodes of the piezoelectric element on the side surface thereof to obtain electrical conduction of the piezoelectric element from the side surface thereof using electrical conduction means. However, the provision of the side electrode greatly increases production cost in terms of the method and process of manufacturing the piezoelectric element from a piezoelectric ceramic. Further, in an element having small size, the provision of the side electrode reduces the distance between the side surface electrode and the other electrode, thus generating a problem involving insulation resistance (caused by application of a high voltage to the piezoelectric element in order to achieve polarization of the element). This makes manufacture of the element impossible.

Electrical connection to the piezoelectric element may also be obtained through an object to be measured if the object to be measured to which the piezoelectric element is adhered is conductive. However, in this case, the object to be measured must be made of a metal and a transparent member cannot be used to construct the object to be measured. In other words, it is impossible to provide a coordinate input apparatus in which an output device, such as a liquid crystal display, is disposed below the coordinate input surface so as to allow the user to input a coordinate as if he or she is drawing a picture on a sheet of paper with a pencil.

Where the coordinate input surface is constituted of a transparent plate-like member, such as a glass, printing an electrode pattern on the glass using a conductive ink or the like has been considered. However, this increases the number of manufacturing processes, thus increasing production cost. Moreover, the printed layer absorbs the sound wave, thus reducing the level of the detected signal (the entire efficiency).

The above-described methods of obtaining electrical connection to the element have the following disadvantages when they are applied to a coordinate input apparatus: whereas one of the electrodes connects through the object to be measured (including the electrode pattern formed on the object to be measured), the other electrode is formed on the surface of the element opposite to that on which the one electrode is formed. Accordingly, the provision of means for making that electrode electrically conductive (which may be a lead formed by soldering or pressing provided by a spring) increases the thickness of the apparatus. In this case, the thickness of the apparatus is the total of the thickness of the plate serving as the object to be measured, the thickness of the sensor and the space required to take out the electrodes.

If the above-described coordinate input apparatus is applied to a portable apparatus (a pen input computer or the like) which has been drawing attention in recent years, it places restrictions of the thickness of the apparatus and adversely affects design thereof.

SUMMARY OF THE INVENTION

A primary object of the present invention is to provide a piezoelectric sensor which is capable of effectively detecting vibrations, particularly, an elastic Lamb wave which propagates in an object to be measured without requiring the object to be measured to be constructed in a special way, enables a thickness including that of the object to be measured to be reduced, and can be manufactured at a low cost.

A second object of the present invention is to provide a coordinate input apparatus which is capable of effectively detecting vibrations, particularly, a Lamb wave without using a coordinate input plate constructed in a special way, enables a thickness thereof to be reduced, and is capable of detecting a coordinate at a low cost and with a high degree of accuracy.

The present invention is directed to a piezoelectric sensor which is fixed to an object to be measured to detect Lamb wave vibrations which propagate in the object to be measured. According to the invention, the sensor has a prismatic shape, and is fixed to the object to be measured at a surface thereof substantially perpendicular to an electrode surface thereof.

The present invention provides a coordinate input apparatus which includes a vibration transmitting plate, vibration generator which is brought into contact with the vibration transmitting plate to instruct a coordinate position, and a plurality of piezoelectric sensors fixed to the vibration transmitting plate at predetermined positions. The vibrations which propagate in the vibration transmitting plate are detected by the plurality of piezoelectric sensors, and a position instructed by the vibration generator is produced on the basis of a detected vibration transmission delay time. The piezoelectric sensor is prismatic, and is fixed to an object to be measured at a surface thereof which is substantially perpendicular to an electrode surface thereof.

The piezoelectric sensor according to the present invention or the piezoelectric sensor employed in the coordinate input apparatus according to the present invention is prismatic, and is fixed to the object to be measured at a surface thereof which is substantially perpendicular to an electrode surface thereof. In this way, an electric signal can be readily obtained from the electrode, and an increase in thickness of the apparatus due to the provision of the electrode of the sensor can be eliminated.

BRIEF DESCRIPTION OF THE DRAWINGS

FIG. 12 shows detection signal waveforms obtained in the second embodiment.

DETAILED DESCRIPTION OF THE PREFERRED EMBODIMENTS

Embodiments of the present invention will now be described with reference to the accompanying drawings.

Figure 1:
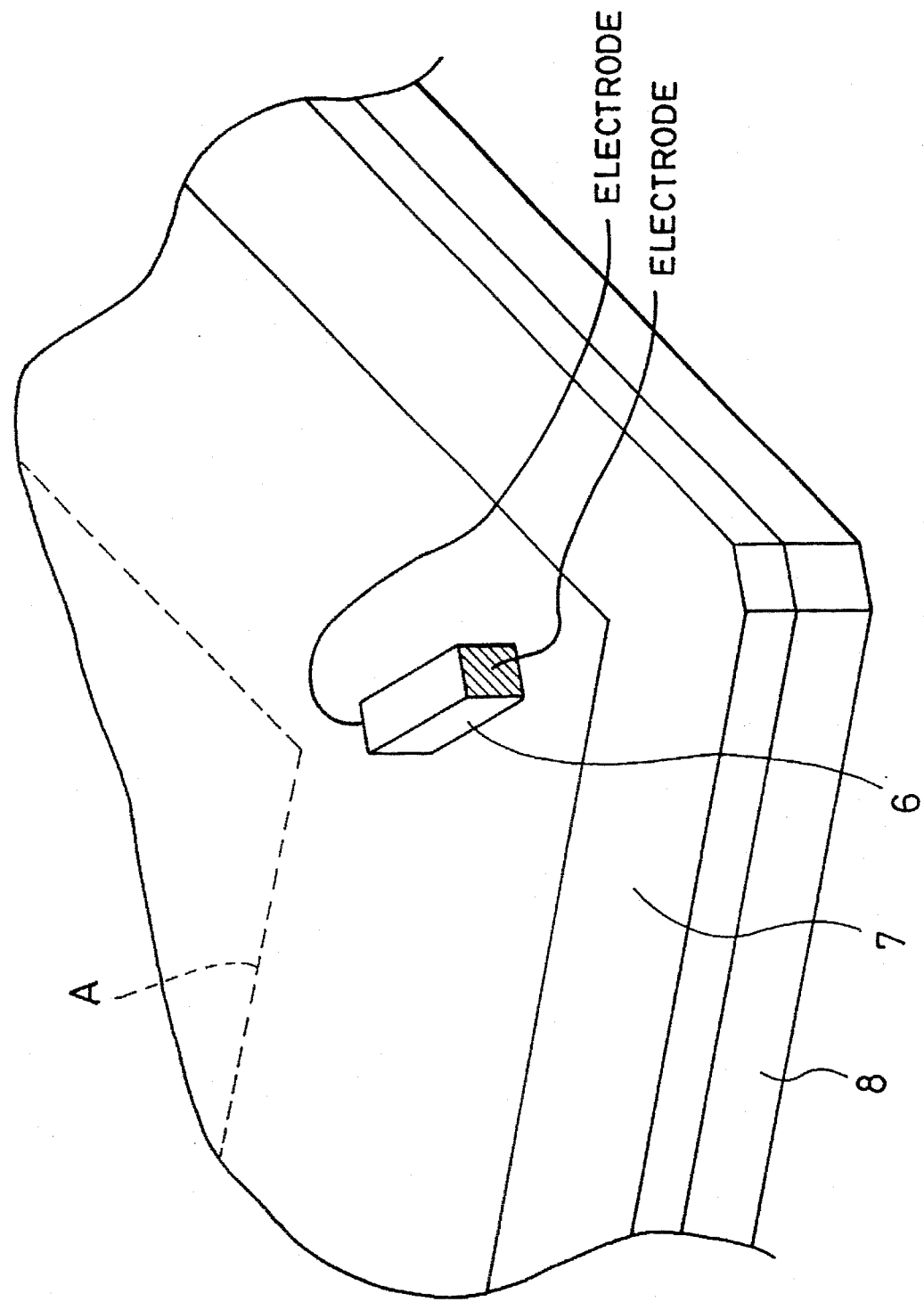
FIG. 1 illustrates the feature of the present invention.

FIG. 1 illustrates the layout of a sensor. In this embodiment, the piezoelectric sensor according to the present invention is applied to a coordinate input apparatus.

Referring to FIG. 1, reference numeral 6 denotes a piezoelectric vibrator (piezoelectric sensor) serving as vibration detection means. In this embodiment, a prismatic longitudinal vibrator (whose length in the direction of polarization is longer than the size of an electrode surface (the length of one side of the electrode surface)) is used. As shown in FIG. 1, one of the surfaces of the piezoelectric element which is parallel to the direction of polarization (which is the surface perpendicular to the electrode surface of the piezoelectric surface) is fixed to and disposed on a vibration transmitting plate 8 serving as a coordinate input surface by, for example, adhesion. Reference numeral 7 denotes a vibration proof material for attenuating reflected waves of the vibrations input by a vibration input pen (not shown) which are reflected by an end surface of the vibration transmitting plate 8. Reference symbol A denotes a coordinate input effective area where the user can input a coordinate.

The properties of a piezoelectric material will be explained below. The element for detecting vibrations effectively has limitations to the shape thereof, as mentioned above. In addition to this, since the element is designed to produce an electrical output as a consequence of mechanical vibrations thereof, it is generally used in a state wherein the resonance frequency thereof coincides with the frequency of vibrations to be detected. That is, in the case of a longitudinal vibrator, since vibrations are detected effectively utilizing the resonance of the element, if the frequency of the vibrations to be detected is determined, the longitudinal length of the element (the length of the element in the direction of polarization) is determined (on the basis of the material of the element). Consequently, displacement of the element in the longitudinal direction thereof is obtained as an electrical output.

In a coordinate input apparatus employing the longitudinal vibrator, since expansion and contraction of the element in the longitudinal direction is converted into an electrical output, the element must be constructed such that it has no mechanical restriction in the longitudinal direction thereof. Accordingly, the element is fixed to the object to be measured at its electrode surface. However, the present inventors conducted experiments using a coordinate input apparatus (whose longitudinal vibrator is fixed at its surface parallel to the direction of polarization), and found that a sufficiently high output signal is obtained. The present invention is based on that knowledge.

In the thus-arranged coordinate input apparatus, extension of the electrodes from the piezoelectric element is facilitated (that is, formation of the electrodes having a complicated shape, which would be otherwise required to extend the electrodes from the element, or formation of a conductive pattern on the vibration transmitting plate 8 in order to obtain electrical conduction to the element is eliminated), and an inexpensive apparatus can thus be provided. Further, since extension of the electrodes is conducted on a surface of the sensor which is perpendicular to the vibration transmitting plate 8, the shape of the sensor is determined by the thickness thereof, thus eliminating an increase in the thickness due to extension of the electrodes (in a case where the longitudinal vibrator is used in a conventional manner, since the electrodes are provided on the surfaces parallel to the vibration transmitting plate 8, extension of the electrodes, e.g., soldering or pressing by a spring, increases the thickness of the sensor). Consequently, the thickness of the apparatus can be reduced.

In this embodiment, a prismatic longitudinal vibrator is used. However, the type of vibrator is not limited to this and, for example, a hexagonal prismatic longitudinal vibrator may also be used.

The structure of the coordinate input apparatus of this embodiment will be described below with reference to FIG. 2.

Figure 2:
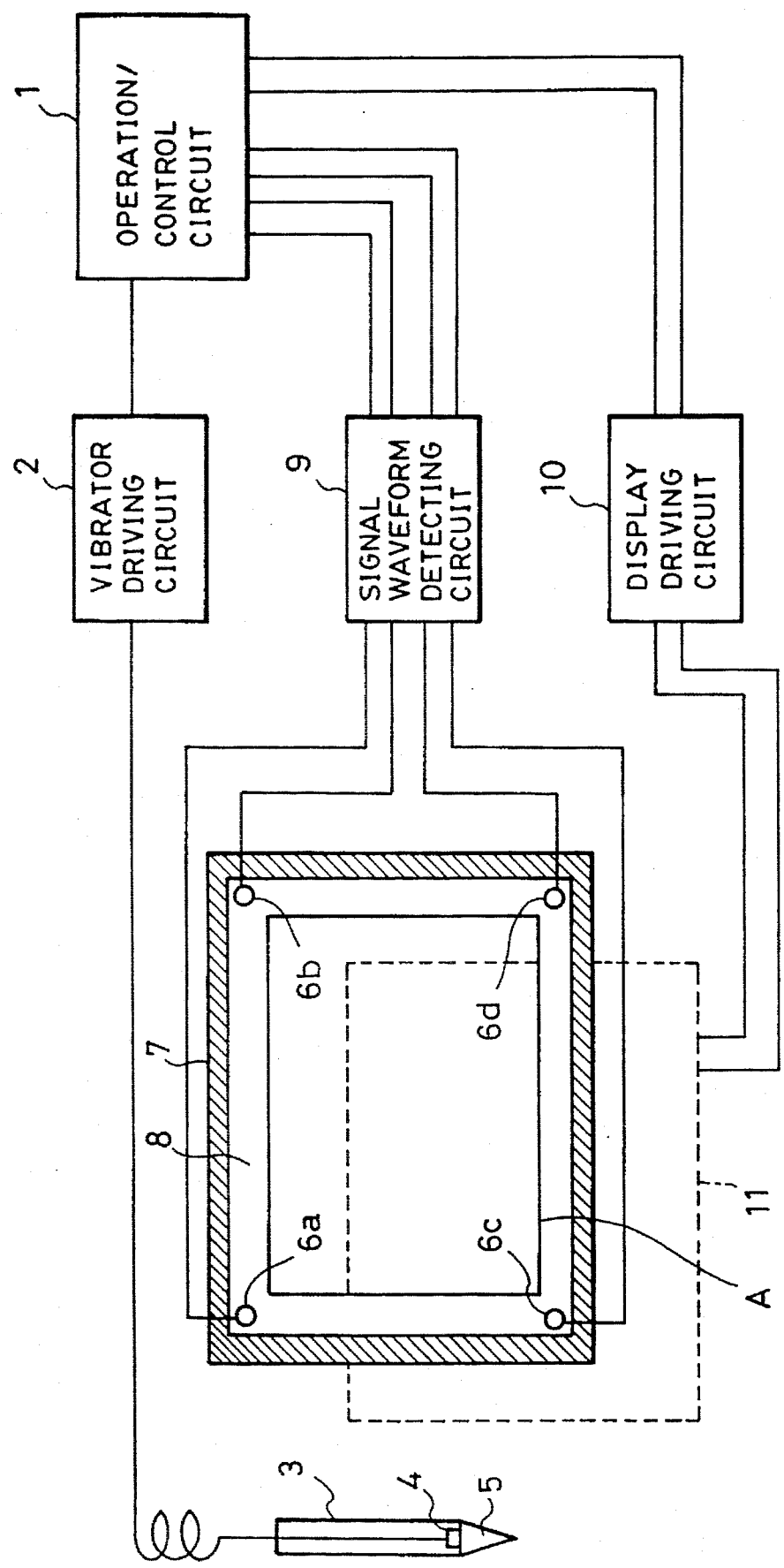
FIG. 2 is a block diagram of a coordinate input apparatus according to the present invention.

In FIG. 2, reference numeral 1 denotes an operation/control circuit for controlling the entire apparatus and for calculating a coordinate position. Reference numeral 2 denotes a vibrator driving circuit for driving a vibrator 4 incorporated in a vibration pen 3 under a control of the operation/control circuit 1 to generate vibrations. The generated vibrations propagate to a pen point 5. At that time, if the vibration pen 3 is in contact with the coordinate input effective area (hereinafter referred to as the effective area, the area indicated by A), the vibrations (sound waves) propagate from the contact position in all directions through the vibration transmitting plate. The vibration transmitting plate 8 is a transparent member made of, for example, an acrylic resin or glass.

The vibrations input by the vibration pen 3 are reflected by the end surface of the vibration transmitting plate 8. The vibration proof member 7 for preventing return of the reflected vibrations to the central portion of the vibration transmitting plate 8 is provided on an outer periphery thereof. As shown in FIG. 2, vibration sensors 6a through 6d each made of a piezoelectric element (which may be pzt) for converting mechanical vibrations into an electrical signal are fixed on the peripheral portion of the vibration transmitting plate 8. The signal from each vibration sensor is amplified by an amplifying circuit (not shown). The amplified signal is sent to a signal waveform detecting circuit 9. The output signal of the signal waveform detecting circuit 9 is sent to the operation/control circuit 1 to calculate a coordinate. The signal detecting circuit 9 and the operation/control circuit 1 will be described in detail later.

Reference numeral 11 denotes a display, such as a liquid crystal display, capable of display in dots. The display 11 is disposed at the rear of the vibration transmitting plate. When driven by a display driving circuit 10, the display 11 displays dots at positions of the vibration transmitting plate 8 at which the vibration pen 3 is brought into contact therewith. The user can see the dots through the vibration transmitting plate 8 (if it is made of a transparent member, such as a glass). The locus of the vibration pen 8 may also be displayed by the movement of a cursor.

The vibrator 4 incorporated in the vibration pen 3 is driven by the vibrator driving circuit 2. The vibrator driving circuit 2 amplifies the driving signal for the vibrator 4 supplied as a low-level pulse signal by the operation/control circuit 1 with a predetermined gain, and applies a resultant signal to the vibrator 4.

The vibrator 4 converts the electric driving signal into mechanical ultrasonic vibrations. The generated vibrations are transmitted to the vibration transmitting plate 8 through the pen point 5.

The vibration frequency of the vibrator 4 is set to a value which assures generation of a Lamb wave in the vibration transmitting plate 8 made of, for example, glass. At that time, effective vibration conversion is assured by setting the resonance frequency of the vibrator 4 containing the pen point 5 at the vibration frequency of the vibrator 4.

The elastic wave transmitted to the vibration transmitting plate 8 in the manner described above is a Lamb wave which has an advantage in that it is less affected by damage or an obstacle on the surface of the vibration transmitting plate 8 as compared with the surface wave.

Control Circuit

The operation/control circuit 1 outputs a signal for driving the vibrator 4 in the vibration pen 3 to the vibrator driving circuit 2 at predetermined time intervals (which may be at every 5 ms). Also, the operation/control circuit 1 starts counting a time by an internal timer (which may be a counter) when it outputs a signal. The vibrations generated by the vibration pen 3 reach the vibration sensors 6a through 6d. The arrival time differs depending on the distance from the vibration pen 3 to each of the vibration sensors.

The vibration wave detecting circuit 9 detects the signal from each of the vibration sensors 6a through 6d and conducts the waveform detection process on the signal to generate a signal representing the timing at which the vibrations has reached the vibration sensor. The operation/control circuit 1 receives the signal for every sensor, and detects the time it has taken for the vibrations to reach each of the vibrations sensors 6a through 6d and thereby calculates the coordinate position of the vibration pen.

Further, the operation/control circuit 1 drives the display driving circuit 10 on the basis of the calculated position data on the vibration pen 3 to control display by the display 11, or outputs the coordinate to an external apparatus by serial or parallel communications (not shown).

Figure 3:
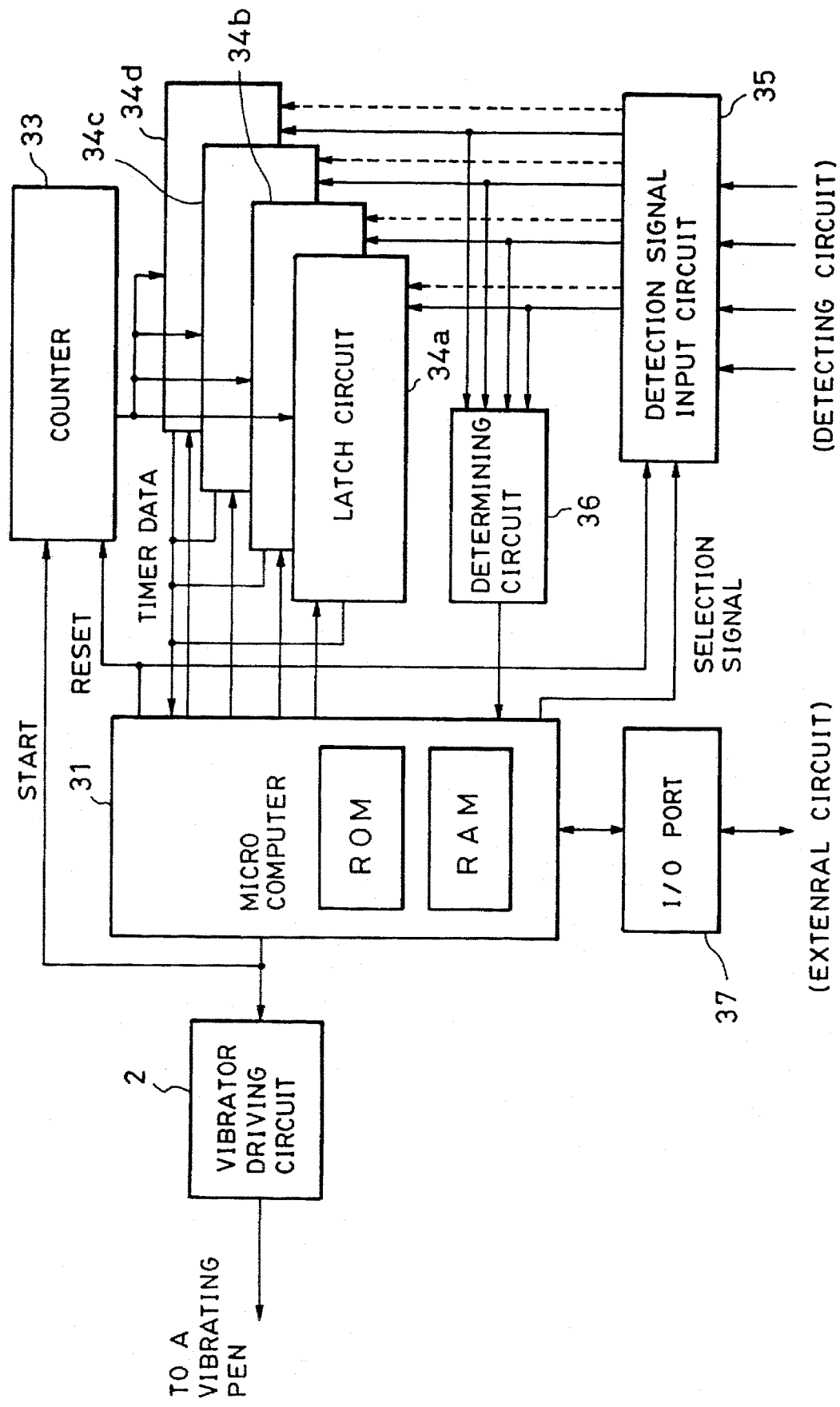
FIG. 3 is a block diagram of an operation/control circuit of a first embodiment of the present invention.

FIG. 3 is a block diagram illustrating the operation/control circuit 1. The components and operation of the operation/control circuit 1 will be described below.

In FIG. 3, reference numeral 31 denotes a micro computer for controlling the operation/control circuit 1 and the entirety of the coordinate input apparatus. The micro computer 31 contains a counter (not shown), a ROM for storing the operation procedures, a RAM used for, for example, calculations, a non-volatile memory for storing constants or the like, and so on. Reference numeral 33 denotes a timer (which may be a counter) for counting a reference clock (not shown). The timer 33 starts counting the time when it receives the starting signal instructed by the operation/control circuit 1 to the vibrator driving circuit 2 to start the drive of the vibrator 4 in the vibration pen 3, whereby start of the counting and detection of vibrations by the vibration sensor are synchronized to measure the delay time it takes for the vibrations to be detected by each of the sensors 6a through 6d.

The timing signals from the vibration sensors 6a through 6d, output from the signal waveform detecting circuit 9, are respectively input to latch circuits 34a through 34d through a detection signal input port 35. The latch circuits 34a through 34d correspond to the vibration sensors 6a through 6d, respectively. When the latch circuit receives the timing signal from the corresponding sensor, it latches the counted value counted by the timer 33 at that time. A determining circuit 36 determines whether or not all the detection signals are received. If all the detection signals are received, the determining circuit 36 informs that to the micro computer 31. Upon receipt of the signal from the determining circuit 36, the micro computer 31 reads out, from the latch circuits 34a through 34d, the times it has taken for the vibrations to reach the vibration sensors and performs predetermined calculations to calculate the coordinate position of the vibration pen 3 on the vibration transmitting plate 8. The calculated coordinate position data is output to the display driving circuit 10 through an I/O port 37 to display, for example, a dot at a position corresponding to the position data on the display 11. The calculated coordinate position data may also be output to an interface circuit through the I/O port 37 to output the coordinate value to an external apparatus.

Detection of Vibration Transmission Time

Figure 4:
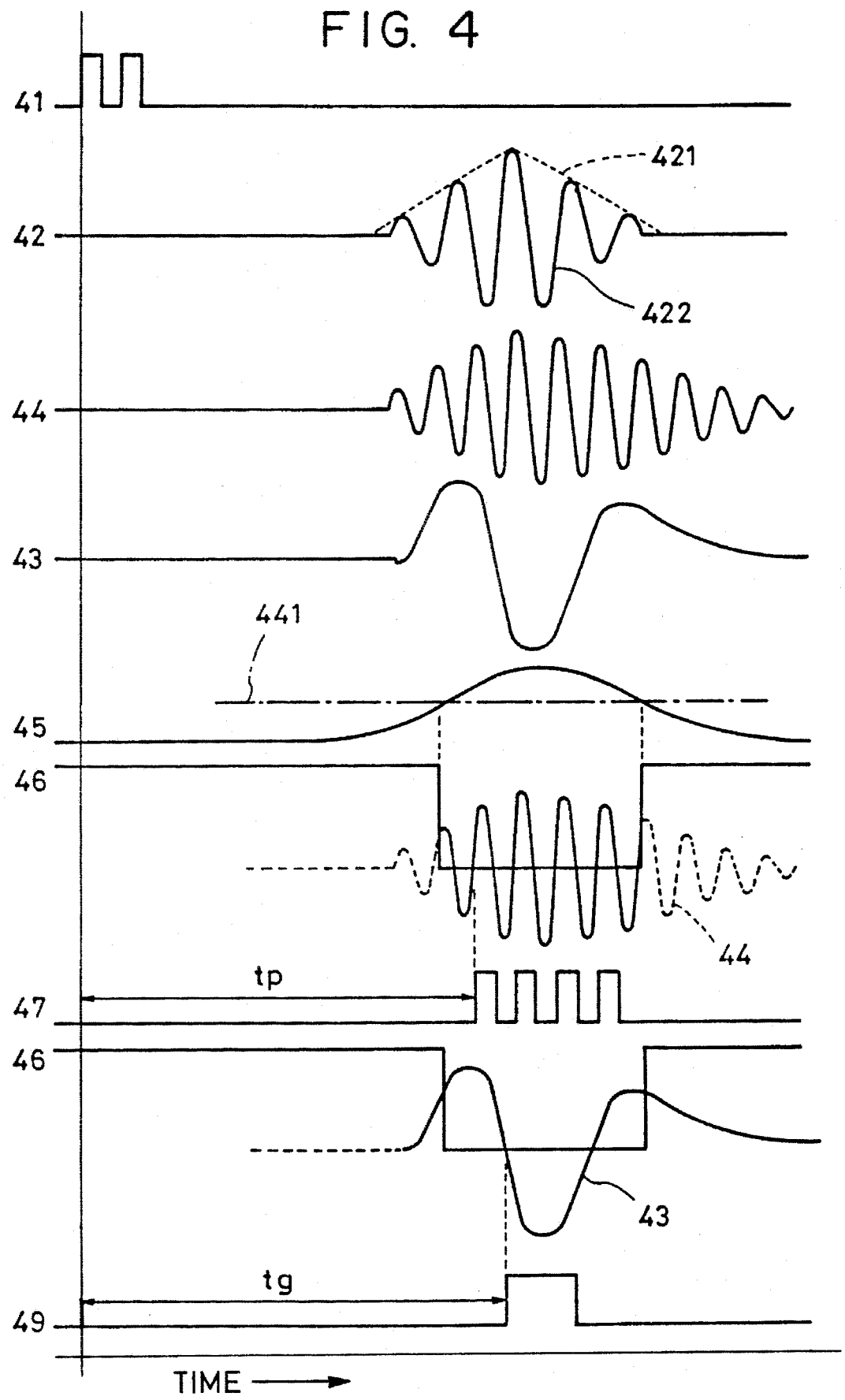
FIG. 4 is a timing chart for signal processing.

FIG. 4 shows the detection waveforms input to the vibration waveform detecting circuit 9, and illustrates the process for measuring the vibration transmission time based on the detected waveforms. The vibration transmission time measuring process for the vibration sensor 6a will be described below with reference to FIG. 4. The same process is employed for the other vibration sensors 6b, 6c and 6d.

As mentioned above, the measurement of the vibration transmission time regarding the vibration sensor 6a starts concurrently with the output of the starting signal to the vibrator driving circuit 2. At that time, the vibrator driving circuit 2 applies a driving signal 41 to the vibrator 4. The ultrasonic vibrations transmitted from the vibration pen 3 to the vibration transmitting plate 8 by the signal 41 progress to the vibration sensor 6a in a time corresponding to the distance to the vibration sensor 6a. The vibrations which have reached the vibration sensor 6a are detected by the sensor 6a. A signal indicated by 42 in FIG. 4 is the signal waveform detected by the vibration sensor 6a.

Since the vibrations employed in the present embodiment are a Lamb wave, as mentioned above, a speed (a group velocity Vg) at which an envelope 421 of the detected waveform propagates and a speed (a phase speed Vp) at which a phase 422 propagates differ from each other. Therefore, the relation between the envelope 421 and the phase 422 in the detected waveform varies according to the distance which the vibrations have propagated during the transmission. In this embodiment, a distance between the vibration pen 3 and the vibration sensor 6a is detected from both a group delay time Tg based on the group velocity Vg and a phase delay time Tp based on the phase velocity Vp.

Figure 5:
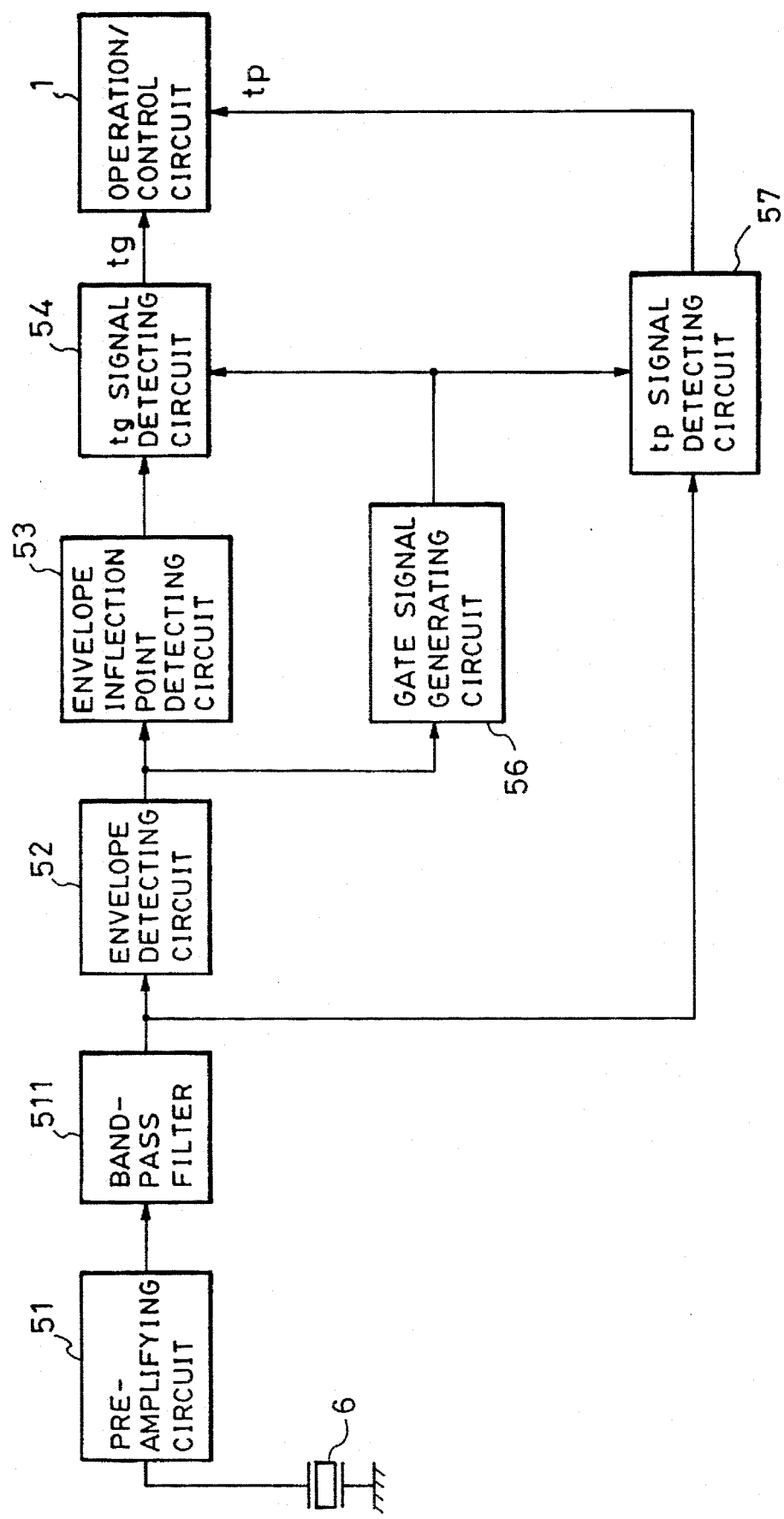
FIG. 5 is a block diagram of a signal detection circuit.

FIG. 5 is a block diagram of the vibration detecting circuit 9. The means for detecting the group delay time Tg and the phase delay time Tp will be described below with reference to FIGS. 4 and 5.

A pre-amplifying circuit 51 amplifies an output signal 42 of the vibration sensor 6a to a predetermined level. A band-pass filter 511 attenuates an unnecessary frequency component of the amplified signal to produce a signal 44. The sound speed at which the envelope of the signal 44 propagates is the group velocity Vg. The delay time tg associated with the velocity speed Vg can be obtained by detecting a special point on the signal waveform, e.g., a peak or an inflection point of the envelope. Hence, the signal amplified by the pre-amplifying circuit 51 and passed by the band-pass filter 511 is input to an envelope detecting circuit 52 constituted by, for example, an absolute value circuit and a low-pass filter, to take out only an envelope 45 of the detection signal. A gate signal generating circuit 56 constituted by, for example, a multivibrator, forms a gate signal 46 of a portion of the envelope 45 which exceeds a preset threshold level 441.

As mentioned above, the group delay time tg associated with the group velocity Vg is detected by detecting the peak or the inflection point of the envelope. In this embodiment, the first inflection point (a zero cross point of the fall of a signal 43 which will be described later) of the envelope is detected. The signal 45 output from the envelope detecting circuit 52 is input to an envelope inflection point detecting circuit 53 to obtain a second differential waveform 43 of the envelope. A tg signal detecting circuit 54 constituted by, for example, a multivibrator compares the differential waveform signal 43 with the gate signal 46 and forms, from the results of the comparison, a tg signal 46 as a delay time detecting signal for an envelope having a predetermined waveform. The formed tg signal 49 is input to the operation/control circuit 1.

The phase delay time tp associated with the phase velocity Vp is detected by a tp signal detecting circuit 57 constituted by, for example, a zero cross comparator or a multivibrator. The tp signal detecting circuit 57 detects the zero cross point of the first rise of the portion of the phase signal 44 generated while the gate signal 46 is generated. A signal 47 representing the phase delay time tp is supplied to the operation/control circuit 1.

The operation of the vibration detecting circuit 9 which is associated with the vibration sensor 6a has been described above. The same circuit as that provided for the vibration sensor 6a may be provided for each of the other vibration sensors. Alternatively, a single common circuit may be provided for the sensors which are selected on a time-division basis using an analog switch or the like.

Calculation of the Distance Between the Vibration Pen and the Sensor

Figure 6:
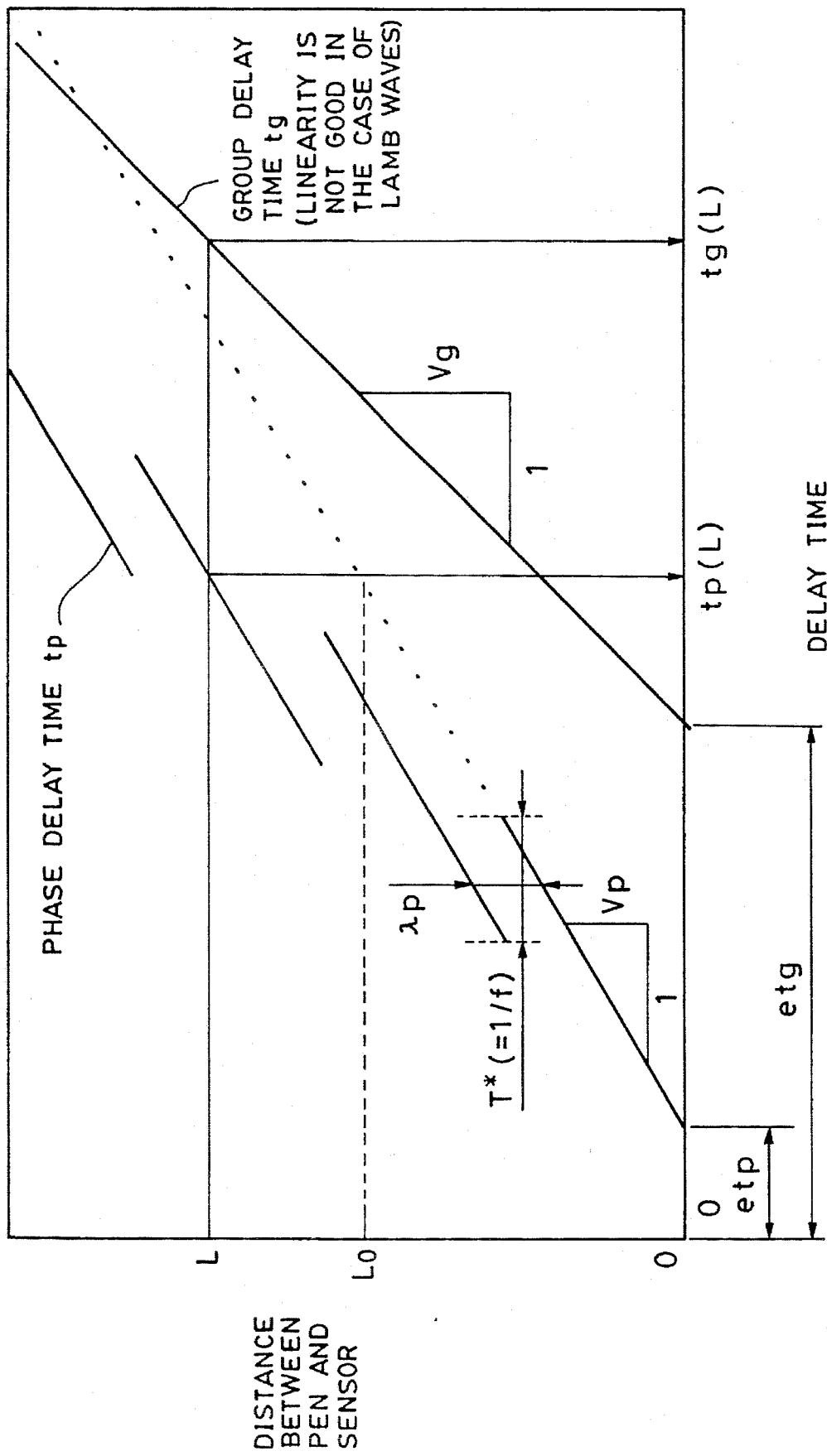
FIG. 6 illustrates the relation between the distance between the pen and the sensor and the delay time.

The method of calculating the distance from the vibration pen to each of the vibration sensors from both the group delay time tg and the phase delay time tp will now be described. FIG. 6 schematically illustrates the relation between the group delay time tg and the phase delay time tp obtained in this embodiment and a distance L between the pen and the sensor. Since the detection wave is a Lamb wave in this embodiment, the group delay time tg does not exhibit excellent linearity. Therefore, a distance L, obtained as the product of the group delay time tg and the group velocity Vg in the manner shown in Equation (1), is not highly accurate.

$$L=Vg \cdot tg \tag{1}$$

Hence, to obtain a highly accurate coordinate, the distance is calculated on the basis of the phase delay time tp exhibiting excellent linearity using equation (2).

$$L=Vp \cdot tp + n \cdot \lambda p \tag{2}$$

where $\lambda_p$ is the wavelength of an elastic wave, and n is an integer. In Equation (2), the first term of the right side indicates a distance L0 shown in FIG. 6, and a difference between an objective distance L and the distance L0 is therefore obtained as a factor of an integer of the wavelength (a width T * of a step on the time axis is a single period of the signal waveform 44. Therefore, T * =1/frequency. The width of the step in terms of the distance is the wavelength $\lambda p$). Thus, the distance L between the pen and the sensor can be accurately obtained by obtaining the integer n. From Equations (1) and (2), we have n by Equation (3):

$$n=[(Vg \cdot tg - Vp \cdot tp)/\lambda p)1/N] \tag{3}$$

where N is a real number other than "0". In a case where N =2, if an error is ±½ wavelength, n can be obtained with a high degree of accuracy using the group delay time tg which does not exhibit excellent linearity. The distance L between the vibration pen 3 and the vibration sensor 6a can be obtained with a high degree of accuracy by inserting the thus-obtained n in Equation (2).

Equation (2) is associated with the vibration sensor 6a alone. The distance between the vibration pen 3 and each of the remaining vibration sensors 6b through 6d can be obtained similarly using the same equations.

Correction of the Circuit Delay Time

The vibration transmission time latched by the latch circuit contains both the phase circuit delay time etp and the group circuit delay time etg (see FIG. 6. the vibration transmission time also contains the time it takes for the vibrations to propagate in the pen point 5 of the vibration pen 3). Transmission of the vibrations from the vibration pen 3 to the vibration transmitting plate 8 and then to the vibration sensors 6a through 6d generates the same amount of errors in the vibration transmission time.

Figure 7:
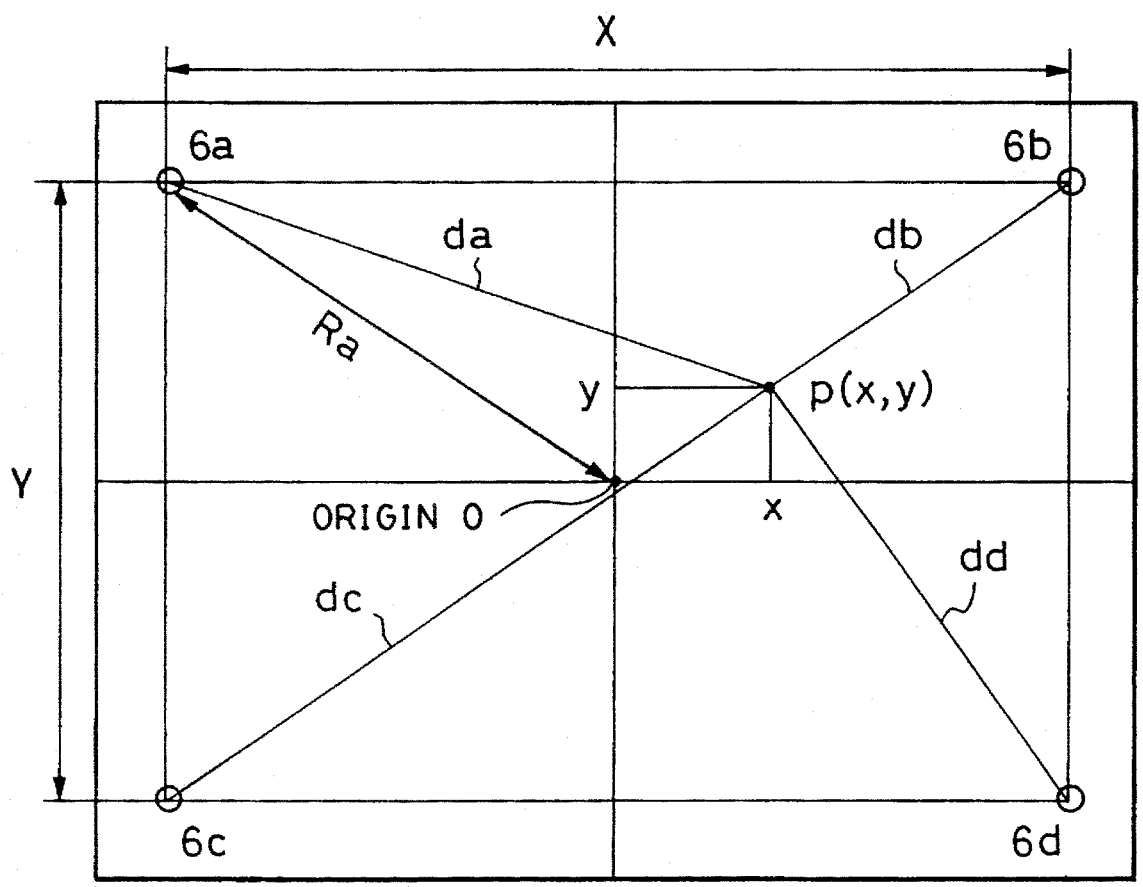
FIG. 7 illustrates calculation of a coordinate.
Figure 8B:
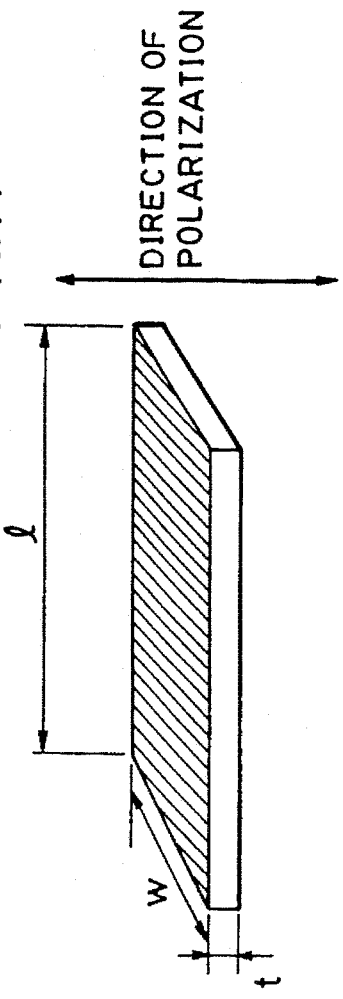
FIGS. 8(a), 8(b), 8(c) and 8(d) illustrate the shapes of normally employed piezoelectric elements.
Figure 8D:
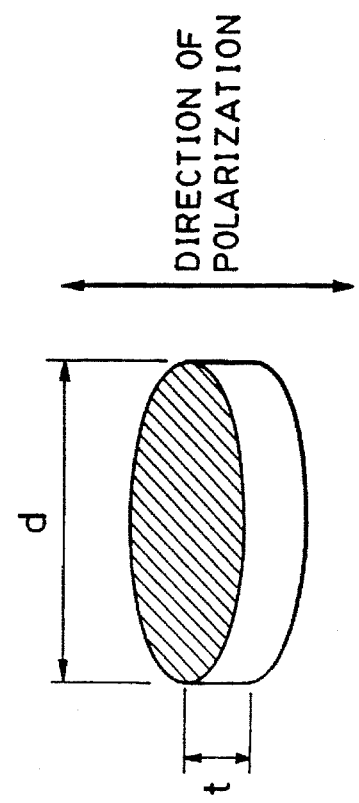
Figure 8A:
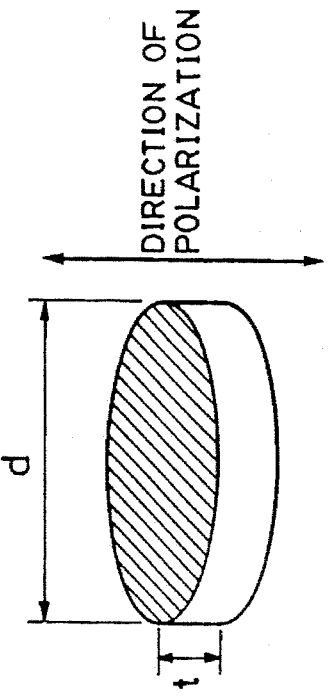
Figure 8C:
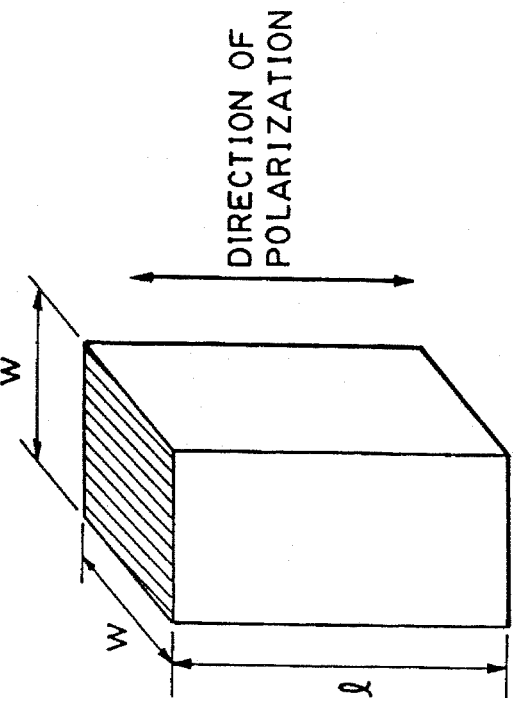

Hence, if a distance from a position of an origin O in FIG. 7 to, for example, the vibration sensor 6a is Ra (=sqr{(X/2)²+(Y/2)²}, see FIG. 7), the measured time it takes for the vibrations input to the origin O by the vibration pen 3 to transmit from the actually measured origin O to the sensor 6a is tg0* and tp0*, and the time it takes for the vibrations from the origin O to the sensor through the medium is tg0 and tp0, we have the relations expressed by the following equations:

$$tg0^*=tg0+etg \tag{4}$$

$$tp0^*=tp0+etp \tag{5}$$

Regarding the actually measured values tg* and tp* at an arbitrary input point P, we have the similar relation expressed as follows:

$$tg^*=tg+etg \tag{6}$$

$$tp^*=tp+etp \tag{7}$$

A difference between Equations (4) and (6) and that between Equations (5) and (7) are obtained by the following equations:

$$tg^*-tg0^*=(tg+etg)-(tg0+etg)=tg-tg0 \tag{8}$$

$$tp^*-tp0^*=(tp+etp)-(tp0+etp)=tp-tp0 \tag{9}$$

In this way, the phase circuit delay time etp and the group circuit delay time etg contained in the transmission time can be removed, and a true difference in the transmission delay time, corresponding to the distance from the position of the origin O to the input point P with the position of the sensor 6a as a point, can thus be obtained. A difference in the distance between the input point P and the sensor 6a can be obtained using Equations (1), (2) and (3). That is, we have $$tg=tg^*-tg0^* \tag{10}$$

$$tp=tp^*-tp0^* \tag{11}$$

The distance can be calculated using Equations (1), (2) and (3), and the distance Ra from the vibration sensor 6a to the origin O is added to the calculated value to obtain the distance between the vibration input pen 3 and the vibration sensor 6a.

Since the distance from the vibration sensor 6a to the origin O is stored in the non-volatile memory or the like beforehand, the distance between the vibration pen 3 and the vibration sensor 6a can be determined. Similar operations are conducted regarding the other sensors 6b through 6d.

The actually measured values at origin O, tg0* and tp0*, and the distances from the sensors to the origin O, Ra through Rd (in this embodiment, Ra=Rb=Rc=Rd), are stored in the non-volatile memory before, for example, shipment, and Equations (8) and (9) are executed before the calculations expressed by Equations (1), (2) and (3) to obtain highly accurate distances.

Calculation of Coordinate Position

The principle of the detection of the coordinate position on the vibration transmitting plate 8 by the vibration pen 3 will be described below. As shown in FIG. 7, when the four vibration sensors 6a through 6d are provided at the positions indicated by S1 through S4 on the four corners of the vibration transmission plate 8, the distances da through dd between the position P of the vibration pen 3 to the vibration sensors 6a through 6d can be obtained on the basis of the aforementioned principle. Thereafter, the operation/control circuit 1 calculates the coordinate (x, y) of the position P of the vibration pen 3 on the basis of the distances da through dd using Pythagorean theorem as follows:

$$x = (d_a + d_b) \cdot (d_a - d_b) / 2X \quad (12)$$

$$y = (d_a + d_c) \cdot (d_a - d_c) / 2Y \quad (13)$$

where X and Y are the distance between the vibration sensors 6a and 6b and the distance between the vibration sensors 6c and 6d, respectively. In this way, the coordinate of the position of the vibration pen 3 can be detected on a real time basis.

In this embodiment, although there are four sensors in total, the above-described calculations are performed using the distance data to the three sensors. The distance data of the remaining one sensor is used to examine the probability of the output coordinate. The coordinate may also be calculated using the three sensors without using the distance data of the sensor having, for example, the largest distance L (an increase in the distance L reduces the level of the detection signal and thus increases the probability that the detection signal is affected by noises). Further, although four sensors are provided and three sensors alone are used to calculate the coordinate in this embodiment, calculation of the coordinate is geometrically enabled if there are at least two sensors. The number of sensors provided can be set according to the specification of the product.

Second Embodiment

Figure 9A:
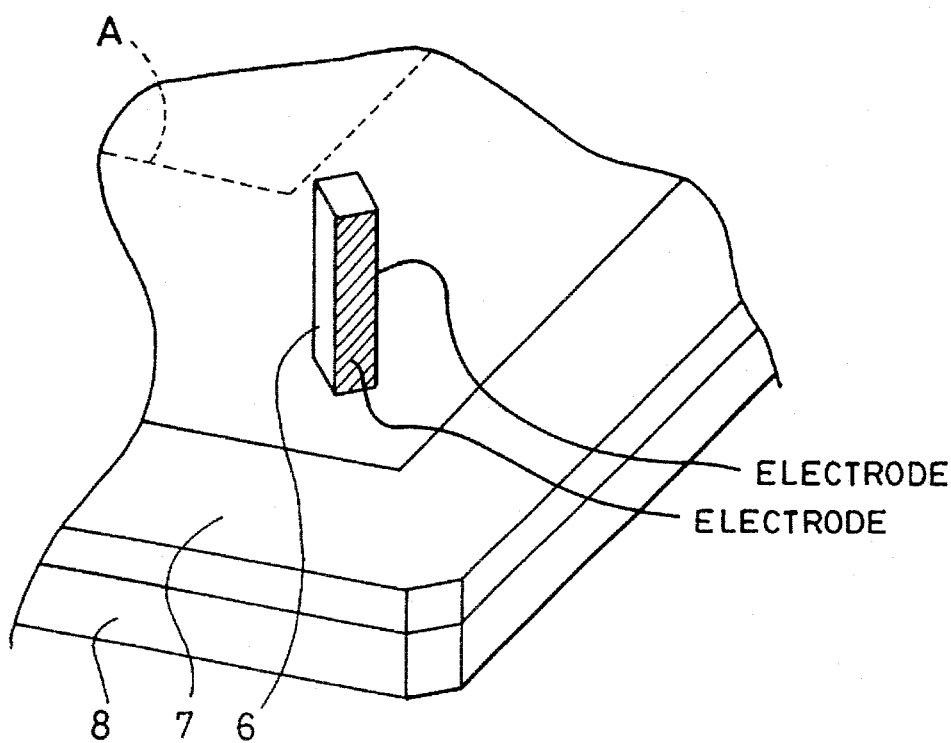
FIGS. 9(A) and 9(B) show a second embodiment of the present invention.
Figure 9B:
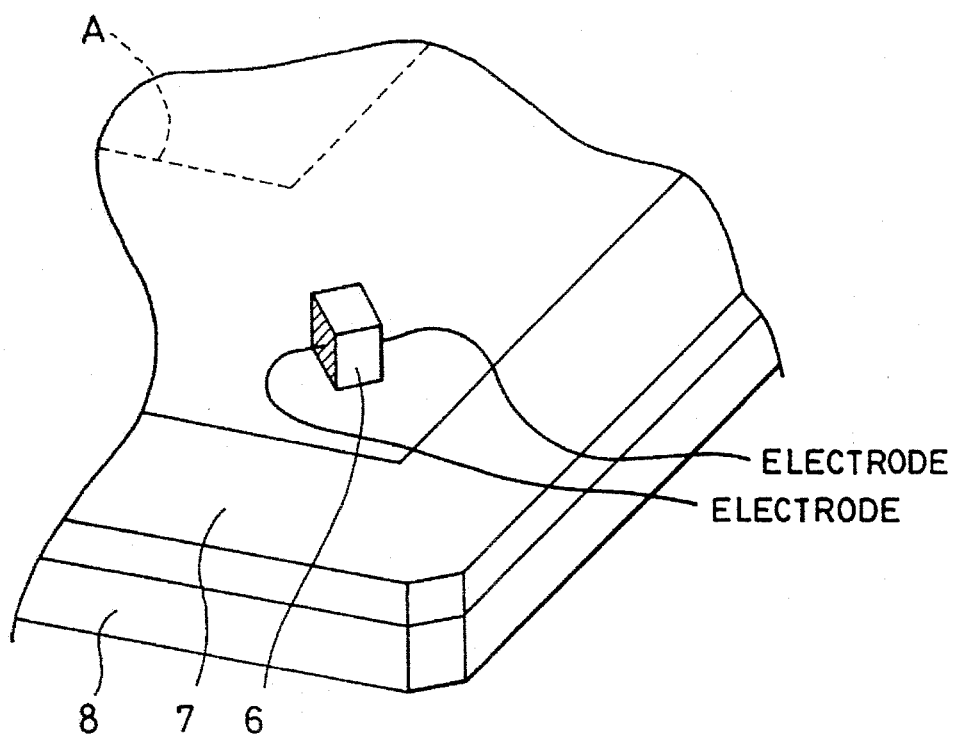

FIGS. 9(A) and 9(B) illustrate the layout of the sensor in a second embodiment of the present invention. In FIG. 9, reference numeral 6 denotes a piezoelectric vibrator (piezoelectric sensor) serving as the vibration detection means. In this embodiment, the vibrator has a prismatic shape, and the piezoelectric element is fixed to the vibration transmission plate 8 serving as the coordinate input surface by, for example, adhesion at one of its surfaces parallel to the direction of polarization. Reference numeral 7 denotes a vibration proof member. Reference numeral 8 denotes a vibration transmitting plate.

In this embodiment, the surface of the element that the element is adhered is substantially square, as shown in FIGS. 9(A) and 9(B). In this way, the resolution with which the coordinate input apparatus detects the coordinate can be improved. More specifically, the vibration input pen 3 instructs any point in the area indicated by A, and the input vibrations thus reach the sensor from many directions. The substantially square surface of the element is advantageous to reduce the errors in the transmission delay time generated by a difference in the direction as much as possible (a difference in the direction is called directivity. Normally, the directivity is removed by using a columnar piezoelectric element. However, in this invention, the use of a columnar element is inconsistent with the purpose of the invention, and an influence of the difference in the direction is reduced as much as possible by reducing the size of the element and by making the adhering surface square).

As mentioned above, there are restrictions of the shape of the element in order to achieve effective detection of vibrations. Particularly, in the case of a substantially square piezoelectric element, such as that shown in FIG. 9(B), the longitudinal resonance frequency associated with the longitudinal effect is substantially equal to the lateral resonance frequency associated with the lateral effect. Thus, the piezoelectric element shown in FIG. 9(B) is conventionally regarded as an ineffective element. However, the present inventors conducted experiments using such an element by adhering the surface thereof parallel to the direction of polarization to the vibration transmission plate, and found that a sufficient output signal could be obtained.

Figure 10A:
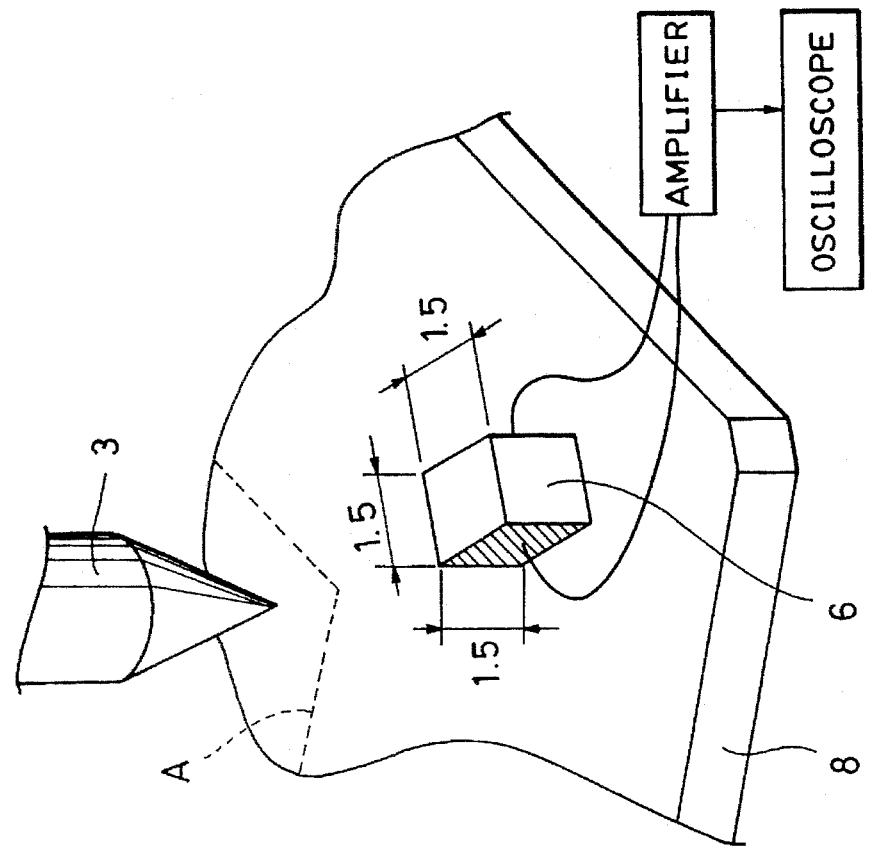
FIGS. 10(A) and 10(B) show comparison between the element according to the present invention and a conventional element.

The numerical conditions of the experiment are as follows: a chemically strengthened crown glass having a thickness of 1.35 mm was used as the vibration transmitting plate 8. The frequency of the vibrations produced by the input pen 3 was 500 kHz. The output levels of different types of sensors 6 were compared. FIG. 10 shows sensors actually employed for comparison. FIG. 10(A) shows a radial vibrator 15 having a conventional shape. This piezoelectric element is fixed to the vibration transmitting plate at one of its electrode surfaces by adhesion. One of the electrodes thereof is made electrically conductive by soldering a lead directly to the element. The other electrode is made electrically conductive by forming a conductive pattern on the vibration transmitting plate 8 using a conductive ink and by connecting a lead to the conductive pattern. The used conductive ink was Dotite FC-403 manufactured by Fujikura Kasei Kabushiki Kaisha. The thickness of the ink was about 30 μm.

Figure 10B:
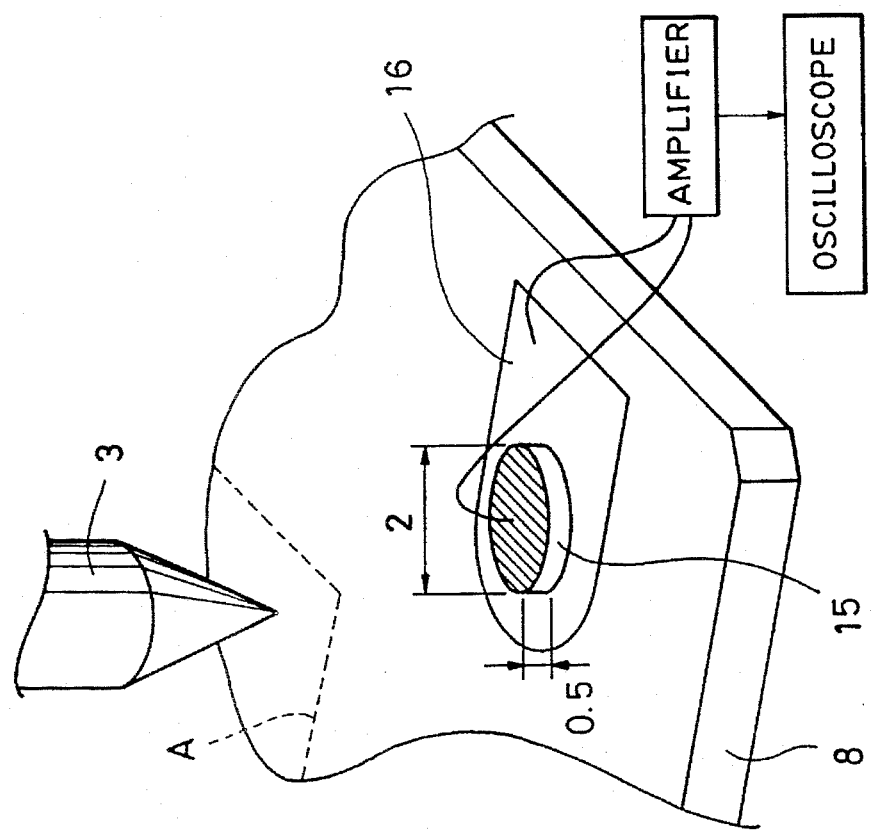

The sensor shown in FIG. 10(B) is a piezoelectric element according to the present invention having a square shape with one side of 1.5 mm. The piezoelectric element shown in FIG. 10(B) is fixed by adhesion to the vibration transmitting plate 8 at its surface parallel to the direction of polarization. Thus, the electrode surface thereof is perpendicular to the vibration transmitting plate 8. Consequently, extension of the electrode is facilitated, and the provision of, for example, the conductive pattern 16 is not necessary.

The present inventors compared the signal level between the sensors shown in FIGS. 10(A) and 10(B) (under the same conditions except for the sensor and the electrode extending method), and found that the signal level of the sensor according to the present invention is about 80 to 100% of that of the conventional sensor shown in FIG. 10(A). FIG. 12 shows the signal waveforms obtained by the sensor according to the present invention. The signal 41 for driving the vibration pen 3 and the detection signal waveform 42 are shown in FIG. 12. The present inventors have determined from the sound speed at which the wave propagates in the vibration transmitting plate 8, obtained from the detected signal (obtained from the relation between the wave delay time and the distance (shown in FIG. 6)), that the detected signal is a Lamb wave having an asynchronous basic mode. This proves that the sensor shown in FIG. 10(B) can be employed as the vibration detection means for the coordinate input apparatus which utilizes a Lamb wave. In other words, it has been found that the Lamb wave propagating in the object to be measured can be detected at a sufficient level by disposing the piezoelectric sensor in the manner shown in FIG. 10(B).

The phase speed Vp of the Lamb wave was about 2200 m/sec and the frequency was 100 kHz. Thus, the wavelength $\lambda p$ of the sound wave is about 4.4 mm. In order to improve the detection resolution of the coordinate input apparatus, the size of the sensor must be sufficiently small relative to the wavelength $\lambda p$ (=4.4 mm). However, too small a sensor causes problems involving assembly and manufacture of the element. Thus, the sensor employed in this embodiment has a square shape one side of which is about 1.5 mm.

In the conventional sensor shown in FIG. 10(A), the printed conductive pattern 16 is disposed between the vibration transmitting plate 8 and the radial vibrator 15. The conductive pattern 16 is an ineffective material in terms of the transmission of vibrations (which greatly attenuates a sound wave) as compared with metal or glass. Thus, much of the sound wave may be attenuated by the printed pattern and does not reach the radial vibrator 15. In other words, even if the effective radial vibrator is employed as the vibration sensor, since the electrode extension means generates a loss, effective detection of vibrations is not assured. In contrast, in the method of disposing the vibration sensor according to the present invention which is slightly less effective than the conventional method, since no loss is generated, substantially the same signal output level as that obtained by the conventional sensor can be obtained.

Third Embodiment

FIG. 11 illustrates the layout of the sensor in a third embodiment of the present invention.

Figure 11A:
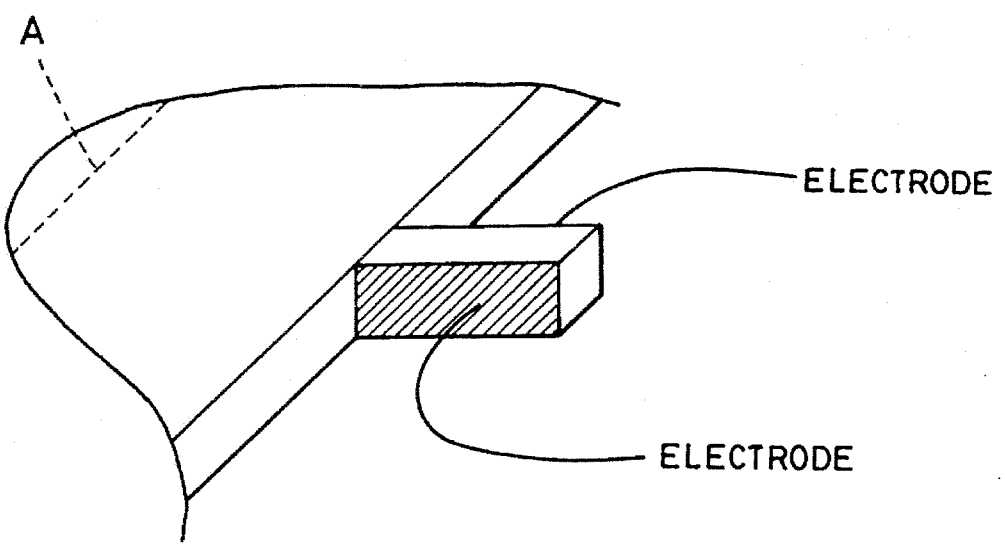
FIGS. 11(A) and 11(B) shows a third embodiment of the present invention.
Figure 11B:
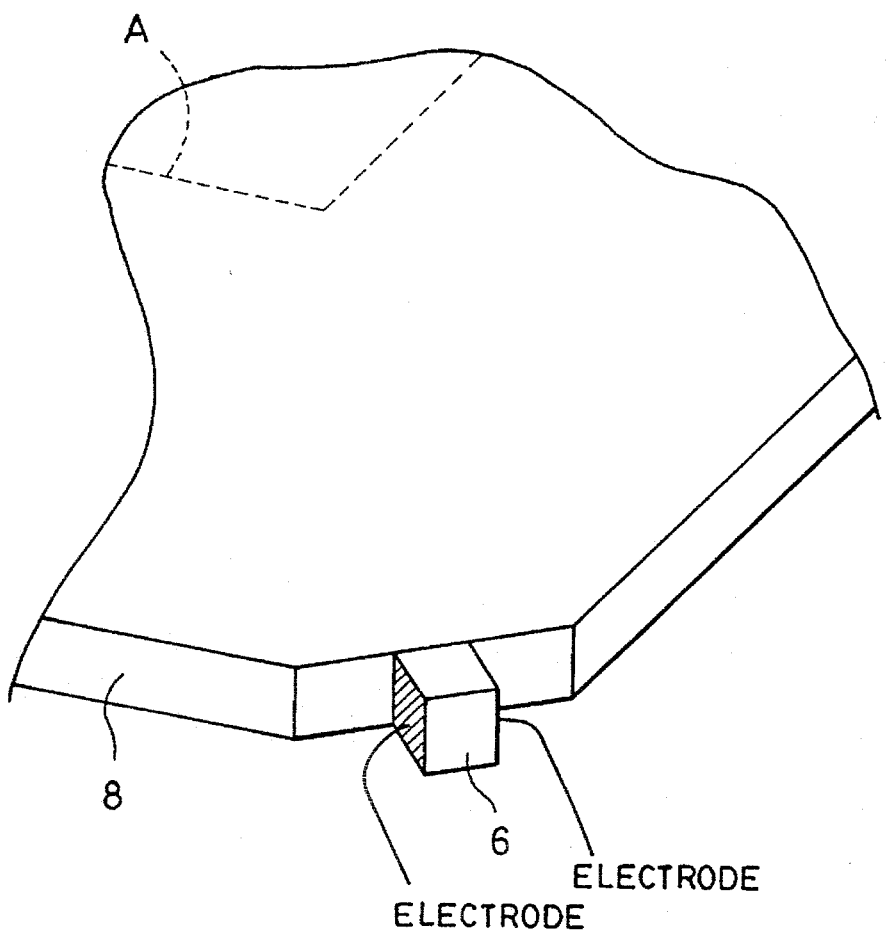

In FIG. 11, reference numeral 6 denotes a piezoelectric vibrator (piezoelectric sensor) serving as the vibration detection sensor. In this embodiment, the piezoelectric vibrator has a prismatic shape, and is fixed by adhesion to an end surface of the vibration transmitting plate 8 serving as the coordinate input surface at one of its surfaces parallel to the directions of polarization thereof (which is the surface thereof perpendicular to the electrode surface thereof). As in the case of the aforementioned embodiment, the adhered surface of the element has a substantially square shape and the length of one side of the square is made equal to the thickness of the vibration transmitting plate 8 in order to improve the resolution with which the coordinate input apparatus outputs the coordinate, as shown in FIGS. 11(A) and 11(B). The length of one side of the square can be set to any value if that value is sufficiently small as compared with the wavelength of the wave to be detected.

Further, since the piezoelectric vibrator serving as the vibration detection means is disposed on the end surface of the vibration transmitting plate 8, the thickness of the entire coordinate input apparatus can be reduced, enabling the apparatus to be applied, for example, to a pen input computer which may be hand-held. More specifically, in a case where the output device, such as a display, is disposed below the coordinate input apparatus, the vibration detection means is disposed on a side of the apparatus which is opposite to the coordinate input surface. In this case, space for accommodating the sensor is required. Accordingly, the gap between the input surface of the output device is increased, making the position at which vibrations are actually input shift from the position at which the coordinate is displayed depending on the position from which the operator views the apparatus. Consequently, operability of the apparatus deteriorates. In order to avoid this problem involving an increase in the gap between the input surface and the output device, the sensor may be disposed outside of the output device. In this case, the size of the input device becomes large as compared with the size of the output device, making the apparatus less handy. Alternatively, the sensor may be disposed on the same level as the input device to avoid the problem. In this case, an upper casing or the like for protecting the sensor is necessary. This increases the height of the apparatus, making the input device less operable. When the sensor is disposed on the end surface of the vibration transmitting plate 8 and is adhered to the vibration transmitting plate 8 at its surface parallel to the directions of polarization, as shown in FIG. 11, it is possible to provide a coordinate input apparatus which facilitates electrical conduction of the sensor, is inexpensive and exhibits excellent operability.

As mentioned above, in this embodiment, since the prismatic piezoelectric element is used and the piezoelectric element is fixed to the object to be measured at its surface parallel to the direction of polarization, direct conduction of the piezoelectric element is enabled for detection of vibrations. Consequently, extension of the electrode from the piezoelectric element is facilitated, and production cost is reduced. That is, it is not necessary for the shape of the electrode to be made complicated or for a conductive layer to be provided on the object to be measured. The structure is simplified, and the sound wave, particularly, the Lamb wave which propagates in the object to be measured can be detected at sufficient sensitivity.

The coordinate input apparatus employing such a piezoelectric sensor has the following advantages.

Since the prismatic piezoelectric element is used as the vibration detection means and the piezoelectric element is fixed to the object to be measured at its surface parallel to the direction of polarization, direct conduction of the piezoelectric element is enabled to detect vibrations. Consequently, extension of the electrode from the piezoelectric element is facilitated, and production cost is reduced. Furthermore, since at least one pair of surfaces parallel to the direction of polarization in the longitudinal or thickness piezoelectric element are substantially square, highly accurate coordinate calculation can be performed without reducing the accuracy with which the coordinate is calculated by the coordinate input apparatus.

Further, since extension of the electrode can be performed on the surface perpendicular to the vibration transmitting plate, the thickness of the portion of the apparatus where the sensor is provided is determined by the shape of the sensor. Consequently, an increase in the thickness of the apparatus due to extension of the electrode can be eliminated, thus reducing the entire thickness of the apparatus.

As will be understood from the foregoing description, the piezoelectric sensor according to the present invention is capable of effectively detecting the vibrations, particularly, the elastic Lamb wave which propagates in the object to be measured without requiring the object to be measured to be constructed in a special way, enables the thickness containing the object to be measured to be reduced, and can be manufactured at a low cost.

The coordinate input apparatus according to the present invention is capable of effectively detecting vibrations, particularly, a Lamb wave without using a coordinate input plate constructed in a special way, enables the thickness thereof to be reduced, and is capable of detecting a coordinate at low cost and with a high degree of accuracy.

What is claimed is:

1. a piezoelectric sensor fixed to an object to be measured to detect Lamb wave vibrations which propagate in said object to be measured, said sensor having a prismatic shape;

wherein, an electrode of said sensor is formed on a surface of said sensor perpendicular to a direction of polarization, and a surface of said sensor parallel to the direction of polarization is fixed to said object to be measured.

2. The piezoelectric sensor according to claim 1, wherein said surface of said sensor fixed to said object to be measured is substantially square.

3. A coordinate input apparatus for calculating and outputting a coordinate position on a vibration transmitting plate instructed by a vibration input pen on the basis of a delay time necessary for plastic wave vibrations inputted on said vibration transmitting plate to reach a piezoelectric sensor, wherein an electrode of said sensor is formed on a surface of said sensor perpendicular to a direction of polarization; and a surface of said sensor parallel to the direction of polarization is fixed to said vibration transmitting plate.

4. The coordinate input apparatus according to claim 3, wherein said surface said sensor fixed to said object to be measured is substantially square.

5. The coordinate input apparatus according to claim 3, wherein said piezoelectric sensor comprises a longitudinal vibration element.

6. A piezoelectric sensor for attachment to an object in which plate vibrations propagate comprising:

a prismatic shaped body having a first surface fixed to a surface of the object; and an electrode on a second surface of the prismatic shaped body perpendicular to the first surface, said electrode being formed on a surface of the prismatic shaped body perpendicular to a direction of polarization.

7. The coordinate input apparatus according to claim 3, wherein at least a pair of surfaces of said sensor opposed to each other and parallel to the direction of polarization are substantially square; and one of said substantially square surfaces of said sensor is fixed to said vibration transmitting plate.

* * * * *

UNITED STATES PATENT AND TRADEMARK OFFICE
CERTIFICATE OF CORRECTION

PATENT NO. : 5,541,892

DATED : July 30, 1996

INVENTORS : KATSUYUKI KOBAYASHI ET AL.

It is certified that error appears in the above-identified patent and that said Letters Patent is hereby corrected as shown below:

ON THE COVER PAGE, item

[56] References Cited-U.S. Patent Documents

Insert --5,162,618  11/1992 Knowles, 5,345,427  9/1994 Ishida et al.--.

COLUMN 1

Line 38,  "more in" should read --more--.

COLUMN 9

Line 50,  "6. the" should read --6; the--.

COLUMN 11

Line 37,  "that" should read --by which--.

UNITED STATES PATENT AND TRADEMARK OFFICE
CERTIFICATE OF CORRECTION

PATENT NO. : 5,541,892                    Page 2 of 2

DATED      : July 30, 1996

INVENTORS  : KATSUYUKI KOBAYASHI ET AL.

It is certified that error appears in the above-identified patent and that said Letters Patent is hereby corrected as shown below:

<u>COLUMN 14</u>

```
Line 46,   "a" should read --A--;
Line 61,   "plastic" should read --elastic--.
```

Signed and Sealed this

Third Day of December, 1996

Attest:

BRUCE LEHMAN

Attesting Officer     Commissioner of Patents and Trademarks